Patented July 24, 1951

2,561,951

UNITED STATES PATENT OFFICE 2,561,951

POLYETHYLENE DISPERSION AND METHOD OF MAKING SAME

Hamilton H. Roberts, Jr., Caldwell, N. J., assignor, by mesne assignments, to Harvel Research Corporation, a corporation of New Jersey No Drawing. Application November 8, 1947, Serial No. 784,928

4 Claims. (Cl. 260—32.8)

This invention relates to novel compositions of matter and to methods for preparing them and also to novel products produced therewith. In one of its aspects the invention is directed to novel polyethylene products which may be easily and readily applied to a base and to methods for producing and applying them.

According to this invention, I provide novel dispersions of normally solid polyethylene, which dispersions are of smooth and uniform texture. These dispersions comprise essentially polyethylene in combination with a liquid having a high vapor pressure at 300° F. and capable of dissolving the polyethylene at elevated temperatures and an organic polar solvent. The polyethylene is the discontinuous phase of said dispersion and said solvents make up the continuous phase. It is preferable that the dispersion also contain a normally solid resin compatible with said polyethylene and having a solubility factor at room temperature (70° F.) of at least 1 part thereof in either of the components of the liquid or continuous phase to prevent a too rapid evaporation from the polyethylene of the continuous phase during the coating step when the dispersion is so employed. The particle size of the polyethylene in the dispersion, with or without the modifying resin is 2–100 microns. I prefer that the particle size of at least 90% by weight of the polyethylene in the dispersion be no greater than 30 microns and that the particle size of the remainder be no greater than 100 microns.

The novel products may be prepared by first at elevated temperature dissolving normally solid polyethylene of any desired molecular weight in an organic solvent such as benzene, toluene, xylene and/or tetrachlorethylene, all of which are capable of dissolving the polyethylene at elevated temperatures below the decomposition temperature of the polyethylene. The ratio by weight of polyethylene to solvent in said hot solution is in the range of 5–95 to 30–70. In the course of affecting said solution, the mix is continuously and vigorously agitated. After complete solution is attained which is evidenced by the mix becoming clear and viscous, the solution is allowed to cool to room temperature and changes from a clear viscous solution to a white, cheesy solid mass with the polyethylene being present therein as the dispersed phase and the solvent as the continuous phase.

Then a quantity of said cheesy mass is mixed with a quantity of an organic polar solvent. The ratio by weight of the cheesy mass to the polar solvent in said mix is such that the quantity of said polyethylene in said mix is 10%–25% of the weight of said mix. In addition, I prefer that the quantity by weight of said polar solvent to the quantity of solvent in said cheesy mass of said mix be in the range of 1–3 to 1–1. The polar solvents which I prefer to employ are the ketone polar solvents, examples of which are methyl ethyl ketone, methyl isobutyl ketone, acetone, etc. This mixture may be processed in any suitable manner, as by high-speed agitation, ball milling, colloid milling, etc., to provide a homogeneous dispersion having an average particle size of less than 30 microns.

When the additional resin is employed to temporarily bind the solvent during coating and to prevent too rapid evaporation of the solvent, the additional resin may be added to the mix of cheesy mass and the polar solvent and dissolved therein at room temperature before converting the mix to a dispersion. Some of the resins which may be used for this purpose are the various vinyl polymers and copolymers, examples of which are polyvinyl chloride, polyvinyl acetate, the copolymers of vinyl chloride and vinyl acetate, and also chlorinated rubber. Among those that I found particularly suitable are "Vinylite VYHH" (87% vinyl chloride and 13% vinyl acetate), "Vinylite VMCH" (86% vinyl chloride and 14% vinyl acetate), and "Parlon" (chlorinated rubber containing approximately 67% chlorine).

The following examples are given by way of illustrating the invention and are not to be regarded in a limiting sense, all parts being given by weight unless otherwise indicated.

Example 1

150 grams of normally solid polyethylene having a melting point of approximately 205° F. is admixed with 510 grams of xylol having a boiling point of about 144° C. This mixture is constantly and vigorously agitated and while in said condition of agitation is heated to a temperature between 205–250° F. and preferably not above 290° F. This heating and agitation is continued until a clear solution is affected. Then the clear solution is allowed to cool slowly to room temperature and at that temperature appeared as a cheesy solid. 132 grams of the cheesy solid were mixed with 68 grams of methyl ethyl ketone in which had been dissolved 4½ grams of VYHH (copolymer of vinyl chloride and vinyl acetate). This mixture was placed in a high speed agitator and processed therein for 15 minutes. The agitator for this purpose was a Waring blender having a speed of 14,000 R. P. M. After 15 minutes of processing in said blender the mix is discharged therefrom as a smooth homogeneous dispersion.

Example 2

150 grams of polyethylene and 500 grams of xylol were heated together at between 205-250° F. and agitated until a clear solution was affected. Then the resultant solution was allowed to cool to room temperature. The resultant product was a cheesy solid. 250 grams of this cheesy solid were mixed with 130 grams of acetone and processed in the same high speed agitator of Example 1 for about 15 minutes and gave a smooth homogeneous dispersion.

Example 3

150 grams of polyethylene and 500 grams of xylol were heated together at between 205°-250° F. and agitated until a clear solution was affected. Then the resultant solution was allowed to cool to room temperature. The resultant product was a cheesy solid. 250 grams of this cheesy solid were mixed with 130 grams of cyclohexanone and processed in the same high speed agitator of Example 1 for about 15 minutes to provide a smooth homogeneous dispersion.

Example 4

150 grams of polyethylene and 500 grams of xylol were mixed and heated together at between 205-250° F. while constantly agitated until a clear solution was obtained. After cooling to room temperature, the resultant product was a cheesy solid. 250 grams of this cheesy solid were mixed with 130 grams of methyl ethyl ketone and processed in the same high speed agitator of Example 1 for about 15 minutes and the resultant product was a smooth homogeneous dispersion.

Example 5

Following the same procedure as that set forth in Example 1, except that 4½ grams of "Parlon" (chlorinated rubber) was substituted for the "Vinylite VYHH" resulted in a smooth homogeneous dispersion.

Example 6

Following the same procedure as that set forth in Example 1, except that 4½ grams of "Vinylite VMCH" was substituted for the "Vinylite VYHH," there was produced a smooth homogeneous dispersion.

These various dispersions made in accordance with this invention may be coated in any convenient manner directly onto the surface of the body to be coated, such as paper, cardboard, textiles, metals, wood, cork, etc. Among some of the methods which may be employed for coating are the well known knife coating and reverse roller coating as well as tower coating. The surface to be coated has applied thereto a 1-2 mil coating of the dispersion and the dispersion coated product is then run through an oven at a temperature of approximately 300° F. whereby the solvent is driven off and the polyethylene particles fuse into a continuous film. This finished coated product finds use as bottle cap liners and chemically resistant liners, electrical insulating materials, etc.

Having thus described my invention, what I claim and desire to protect by Letters Patent is:

1. A homogeneous dispersion comprising a dispersed phase and a continuous phase, said dispersed phase comprising polyethylene, said continuous phase comprising a solution of a resin and a liquid capable of dissolving said polyethylene at elevated temperature and an organic polar liquid differing from and compatible with said first mentioned liquid, the particle size of said dispersed phase being in the range of 2-100 microns, the solubility factor of said resin being at least 1 part thereof to 5 parts of said liquid, the ratio by weight of said polyethylene to said first mentioned liquid being in the range of 5-95 to 30-70.

2. The method comprising at elevated temperature dissolving normally solid polyethylene in an organic liquid capable of dissolving said polyethylene at the elevated temperature employed, cooling the resultant solution to a cheesy mass, the ratio by weight of said polyethylene to said solvent being in the range of 5-95 to 30-70, mixing a quantity of said cheesy mass with an organic polar liquid differing from and compatible with said solvent, the quantity by weight of said polar liquid to said cheesy mass being such that the quantity of said polyethylene is 10%-25% of the weight of said mix, and dispersing said mix to provide a homogeneous dispersion whose particle size in the dispersed phase is in the range of 2-100 microns.

3. The method comprising at elevated temperature dissolving normally solid polyethylene in xylol, cooling the resultant solution to a cheesy mass, the ratio by weight of said polyethylene to said xylol being in the range of 5-95 to 30-70, mixing a quantity of said cheesy mass with an organic polar liquid differing from and compatible with said xylol, the quantity by weight of said polar liquid to said cheesy mass being such that the quantity of said polyethylene is 10%-25% of the weight of said mix, and dispersing said mix to provide a homogeneous dispersion whose particle size in the dispersed phase is in the range of 2-100 microns.

4. The method comprising at elevated temperature dissolving normally solid polyethylene in xylol, cooling the resultant solution to a cheesy mass, the ratio by weight of said polyethylene to said xylol being in the range of 5-95 to 30-70, mixing a quantity of said cheesy mass with methyl ethyl ketone, the quantity by weight of methyl ethyl ketone to said cheesy mass being such that the quantity of said polyethylene is 10%-25% of the weight of said mix, and dispersing said mix to provide a homogeneous dispersion whose particle size in the dispersed phase is in the range of 2-100 microns.

HAMILTON H. ROBERTS, Jr.

REFERENCES CITED

The following references are of record in the file of this patent:

UNITED STATES PATENTS

| Number | Name | Date |
|---|---|---|
| 2,384,848 | Peters | Sept. 18, 1945 |
| 2,386,674 | Flint et al. | Oct. 9, 1945 |

FOREIGN PATENTS

| Number | Country | Date |
|---|---|---|
| 491,804 | Great Britain | Sept. 8, 1938 |
| 511,054 | Great Britain | Aug. 11, 1939 |

OTHER REFERENCES

British Plastics, April 1945, pp. 148-149.